Figure 1:
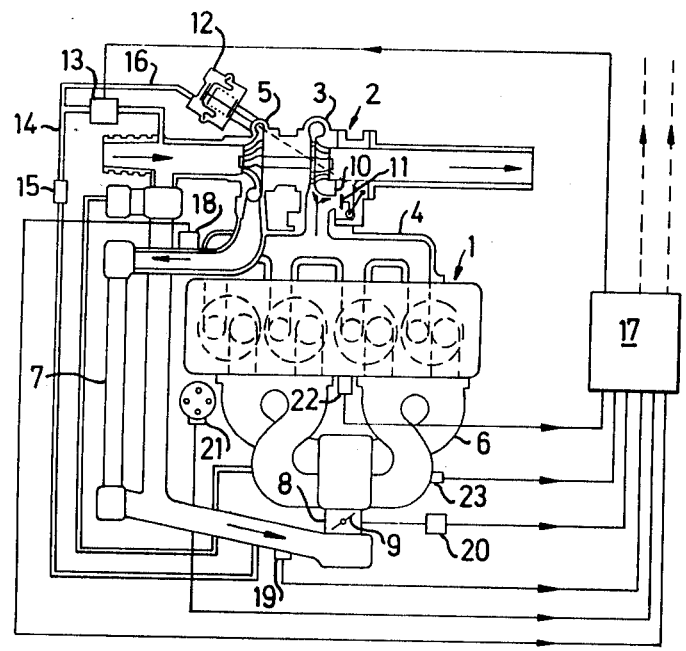

United States Patent [19]

Rydquist et al.

[11] Patent Number: 4,467,607
[45] Date of Patent: Aug. 28, 1984

[54] SYSTEM FOR CONTROLLING THE INLET PRESSURE IN A TURBOCHARGED COMBUSTION ENGINE

[75] Inventors: Jan E. Rydquist, Billdal; Lars Sandberg, Gothenburg; Ralf Wallin, Lindome, all of Sweden

[73] Assignee: AB Volvo, Gothenburg, Sweden

[21] Appl. No.: 348,721

[22] Filed: Feb. 16, 1982

[30] Foreign Application Priority Data

Feb. 19, 1981 [SE] Sweden .............................. 8101119

[51] Int. Cl.³ .............................................. F02B 37/12
[52] U.S. Cl. .................................................... 60/602
[58] Field of Search ................. 60/600, 601, 602, 603, 60/611; 123/564

[56] References Cited

U.S. PATENT DOCUMENTS

| | | | |
|---|---|---|---|
| 2,901,885 | 9/1959 | Reggio | 60/603 |
| 4,292,806 | 10/1981 | Moore et al. | 60/600 |
| 4,372,119 | 2/1983 | Gillbrand et al. | 60/600 |
| 4,392,352 | 7/1983 | Stumpp et al. | 60/602 |

FOREIGN PATENT DOCUMENTS

| | | | |
|---|---|---|---|
| 84818 | 6/1980 | Japan | 60/602 |
| 561932 | 6/1944 | United Kingdom | 60/600 |

*Primary Examiner*—Michael Koczo
*Attorney, Agent, or Firm*—Young & Thompson

[57] ABSTRACT

A system for controlling the inlet pressure in a combustion engine includes a microprocessor wherein a command value for the pressure as a function of engine speed is stored and which controls a solenoid valve controlling the pressure in a pneumatic operating mechanism to a waste gate in a shunt pipe past the turbine.

4 Claims, 5 Drawing Figures

SYSTEM FOR CONTROLLING THE INLET PRESSURE IN A TURBOCHARGED COMBUSTION ENGINE

The present invention relates to a system for controlling the inlet pressure in a combustion engine, in which the engine speed and the actual inlet pressure are directly or indirectly continuously monitored during the operation, comprising means for sensing the actual inlet pressure, means for sensing the engine speed and signal processing means, arranged to receive signals sent from the sensing means representing pressure and engine speed and to send control signals dependent thereon to means controlling the inlet pressure.

By increasing engine compression ratio it is possible to increase fuel economy and performance, but in turbocharged engines, such a step limits the advantages of turbocharging, since the maximum charge pressure is limited by the tendency of the engine to knock. In Otto-engines, the desire to increase performance with the aid of turbo supercharging stands in conflict with the tendency of the engine to knock when the intake pressure is sharply increased or if the engine is supplied with a fuel of too low quality.

In order to avoid knocking in a turbocharged engine, with subsequent risk of engine damage, a control system has been developed which detects knocking and automatically lowers the charge pressure to a level at which the knocking ceases. The system is a passive system, i.e. knocking must be detected before regulation takes place, and it has a fixed set command value for the maximum permissible charge pressure to limit the increase in engine performance if supplied with a fuel with very low tendency to cause knocking. The system does not provide any real increase in performance, since an increase in performance only takes place when changing from a fuel of low quality to a fuel of high quality, the fixed command pressure value setting the limit for the increase.

The purpose of the present invention is to provide a system for controlling the inlet pressure in a combustion engine, which makes possible optimization of fuel economy and performance by optimizing the pressure at all operational states.

This is achieved according to the invention by the actual inlet pressure being continuously compared to and adjusted in relation to a command pressure value for each rpm within a speed range, the upper limit of which is the maximum engine rpm.

A system of the type described by way of introduction, is characterized in that the signal processing means comprise means with a memory function, preferably a microprocessor, in which a command value for the inlet pressure as a function of the engine speed is stored for a predetermined rpm range, the command value lying below the limit for knocking combustion for a given fuel quality at steady state operation.

In contrast to the abovementioned known system, the system according to the invention is an active system which at every operational state at full load can regulate the actual pressure to a value close to the limit for knocking. This provides higher average pressure and higher performance for a given fuel quality. Furthermore, almost the entire influence of mechanical tolerances is eliminated. The system also provides an increase in the engine compression ratio to improve partial load performance, since performance at full load can be kept at a high level by calibrating the command value of the charge pressure close to the limit for knocking. The invention makes it possible to adapt the level to changes in various parameters which affect combustion, e.g. the temperature, pressure and humidity of the air and the engine temperature, so as to achieve optimum adaptability to the engine knock limit.

The system according to the invention is a system for closed loop pressure control, which is primarily designed to function without the assistance of a knock detecting system. The functional principle per se requires no knock detection, but when the advantages of the invention are fully exploited, the margins to harmful knocking are much less than in conventional pressure regulation, and therefore a knock detector function is suitably included in the system, so that the actual pressure is rapidly lowered below the command pressure value when knocking occurs, for example if the engine is supplied with fuel of too low quality.

Tests made in the development of the system according to the invention for a turbocharged engine have revealed the possibility of using transient supercharging for increased performance of short duration. An increase in charge pressure of up to 45% could be permitted during a short period without the knock intensity becoming unacceptably high, provided that the pressure was gradually reduced to the steady state value within a period of 20 seconds. This fact is utilized in a further development of the invention by sensing for example the rate of opening of the throttle and at a certain speed increasing the command pressure value above the steady state value. A timed reduction of the pressure was then effected to this steady state pressure. The transient function is achieved with simple means by allowing for example a potentiometer to send a signal dependent on the throttle movement to a microcomputer with a time function. The construction permits sharp increase in the engine performance for short periods of time to increase acceleration for example for safe passing of other vehicles.

Figure 2:
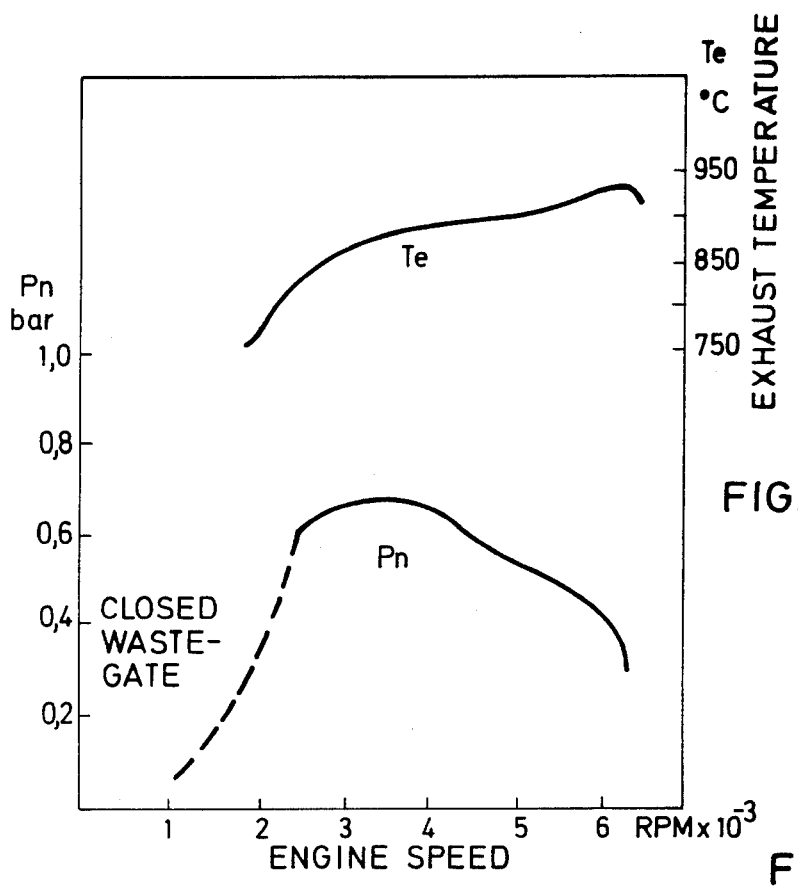
Figure 3:
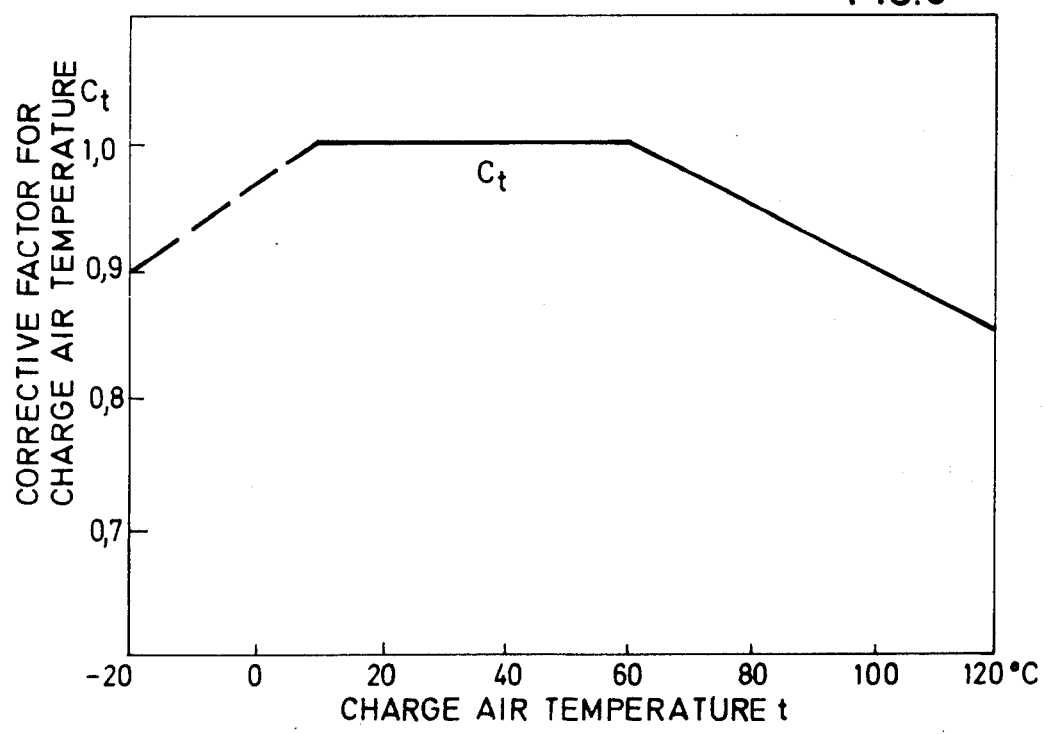
Figure 4:
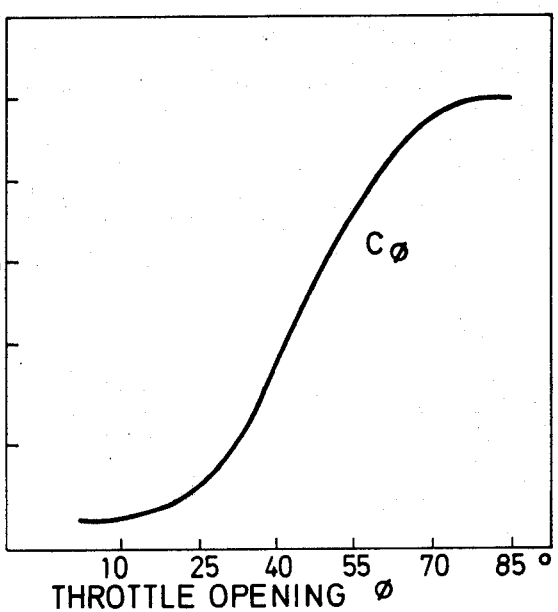
Figure 5:
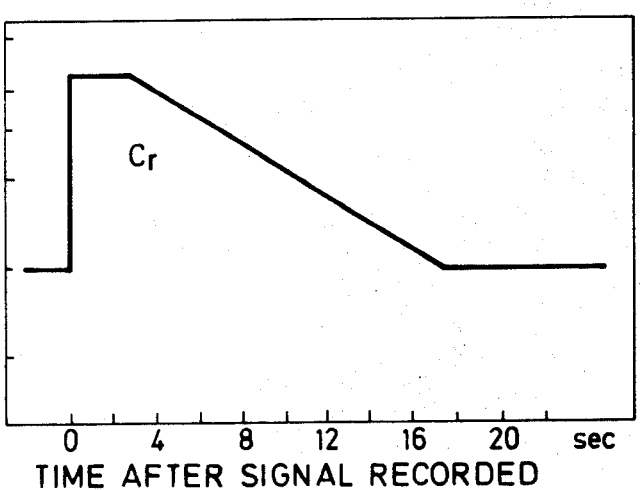

The invention will be described in more detail with reference to an embodiment shown in the accompanying drawings, of which FIG. 1 shows schematically a turbo-charged combustion engine with a system according to the invention for controlling the charge pressure, FIG. 2 shows a diagram of the command value of the charge pressure and the resulting exhaust temperature as a function of engine speed, and FIGS. 3, 4 and 5 show diagrams of various correction factors for the command value in FIG. 2.

The engine 1 shown in FIG. 1 is a four-cylinder Otto engine with a turbocompressor unit 2, (known per se), comprising a turbine portion 3 communicating with the engine exhaust manifold 4 and a compressor portion 5 communicating with the engine intake manifold 6 via a charge air cooler 7 of air-airtype and a throttle body 8 containing the engine throttle 9. The gasflow through the turbine 3 is regulated in a known manner with the aid of a waste gate 11 coupled into a shunt pipe 10, which can be actuated by a pneumatic operating mechanism 12 and which when closed directs the entire gasflow through the turbine. The pressure in the operating mechanism 12 and thus the setting of the waste gate is determined by an electromagnetic frequency valve 13 in a line 14 which, via a calibrated constriction 15, connects the suction and pressure sides of the compressor to each other and from which a line 16 branches to the operating mechanism 12. During operation, the frequency valve switches periodically between the open and closed positions and by varying the period length, the pressure in the line 16 can be varied thus varying the pressure in the operating mechanism 12 as well.

The frequency valve 13 is controlled by a signal processing unit in the form of a microprocessor 17, to which signals are fed representing engine rpm, throttle position, charging airpressure and charging air temperature. The input signals to the microprocessor are obtained from various sensors 18, 19, 20 and 21. The sensor 18 placed in the pipe between the compressor 5 and the intercooler 7 can be a piezoresistive transductor, which registers the charge pressure. The sensor 19 can be a fast NTC-resistor, which registers the charge air temperature and the sensor 20 can be a potentiometer 20 coupled to the throttle 9, to register the throttle position. Signals representing engine speed can be obtained from a Hall-effect sensor 21 already present in the distributor.

On the basis of the input signals from the sensors 19, 20, 21, the processor 17 determines the command value of the charging pressure at each operational state. The signal from the charging pressure sensor 18 provides information on any deviation between the command value and the actual value of the charge pressure. Signals indicating actual charge pressure which is too low results in the processor 17 increasing the opening time of the valve 13, which in turn results in a pressure drop in the line 16 to the operating mechanism 12, which then moves the waste gate 11 towards the closed position. The flow through the shunt pipe 10 drops and the turbine speed increases thereby increasing the charge pressure. The reverse procedure occurs if the actual charge pressure is too high.

By this closed looping of the charge pressure, it is possible to keep the charge pressure continuously at a predetermined value. The principle provides great flexibility in determining the charge pressure characteristic and makes the system independent of mechanical tolerances such as, for example, variations in the characteristic of the return spring means in the operating mechanism 12.

Based on data from bench tests, there is stored in the microprocessor memory, for a given fuel quality and knock security margin, the base value of maximum permissible charge pressure as a function of engine speed. FIG. 2 shows as an example the command value $P_n$ for an engine which was used in the tests made. This engine was a four-cylinder 2.1 liter turbocharged engine designed to be driven on leaded 97 RON petrol and produced in the standard version with conventional charge pressure control, a maximum power of 114 kW DIN with a maximum torque of 240 Nm DIN.

The following description relates to this engine equipped with a closed loop control system according to the invention, the curve in FIG. 2 indicating the base value stored in the processor of the charge pressure at full load and steady operational state at various rpm's. To achieve the desired fine-control and close following of the engine knock boundary, correction factors were defined based on the signals from the throttle position sensor 20 and the temperature sensor 19, which are multiplied by the stored base value to determine the absolute command value at each rpm.

FIG. 3 shows how the correction factor $C_t$ for the charge air temperature is selected to affect the base value. For temperatures over 60° C., the maximum permissible charge pressure was lowered to avoid raising the exhaust temperature and operation at or close to knock conditions. The maximum permissible charge pressure was also lowered for temperatures below 10° C. to compensate for the increased charge density which would cause greater knock sensitivity.

FIG. 4 illustrates how the correction factor $C_\phi$ for the throttle position to control the pressure differential over the throttle. Turbocharged engines with the throttle position downstream of the compressor usually have a greater pressure differential over the throttle compared with an equivalent naturally aspirated engine at road load conditions. Especially at medium speeds, the pressure differential for the turbocharged engine can be twice that for the naturally aspirated version. If no throttle position correction is used, small throttle opening changes would then result in relatively large torque variations. Also, since the boost level is a function of time, frequent small throttle position adjustments would be needed for torque control. This inconvenience can be minimized by careful attention to the accelerator-throttle opening progressiveness, but further improvement can be obtained by the correction, shown in FIG. 3, of the command value as a function of the throttle position, when the progressiveness can be optimized for all load and speed conditions. Boost modulation via throttle control is a special advantage for a vehicle with high performance, since good torque control is necessary when a vehicle is driven in slippery conditions.

To achieve the transient function described in the introduction, involving a temporary raising of the maximum charge pressure above the maximum pressure at steady state, i.e. above the command value curve in FIG. 2, a correction factor $C_r$ was selected as a function of time as shown in the curve in FIG. 5. The input signal representing the rate of opening of the throttle was obtained from the potentiometer 20 sensing the throttle position. It can be coupled to any means at all which produces an increase in load, e.g. the throttle arm in the injection pump of a diesel engine. The processor was programmed to multiply the command value $P_n$ by the transient factor $C_r$ at throttle opening speeds exceeding 1°/ms and at an absolute increase of the opening angle of at least 15°, the latter to avoid sensing engine vibrations or vehicle movements which otherwise could trigger the transient function. To prevent thermal overloading, the processor was programmed, after reducing the pressure to the command value, to prevent renewed transient supercharging during a certain minimum period, e.g. circa 4 seconds.

The microprocessor control made it possible at full load to place the level for maximum charge pressure slightly below the boundary for knock to increase engine performance for a given fuel quality. However, since the safety margins to harmful knock are thus quite small, the system was supplemented for safety reasons with a knock sensor 22, which in the test engine consisted of a piezo-electric accelerometer mounted on the engine block, continuously monitoring the engine for knocking operation. The processor was programmed to lower the charge pressure in steps upon registering of a predetermined knock intensity, and as the knocking ceases to restore at a slower rate the charge pressure to the original value.

The control system shown in FIG. 1 also includes a safety device in the form of a pressure switch 23 mounted on the intake manifold. This switch shuts off the fuel pump if a fault should occur in the system resulting in the charge pressure exceeding the permissible value.

A comparison of the test results from the mentioned engine with a conventional charge pressure control and the test results from a modified engine with a control system according to the invention in which the maximum power of 114 kW at steady operating state was maintained, i.e. the same power as the firstmentioned engine, revealed that an increase of maximum torque of about 10% could be obtained in the latter. Fuel consumption in mixed driving was about 16% lower than in the standard engine and the acceleration time from 90 to 140 km/h could be shortened by about 9%. These figures are without the use of the transient function. Maximum transient power amounted to about 145 kW, which resulted in a shortening of the acceleration time from 90 to 140 km/h by an addition of 11%, thus a total of 20% shorter time than with the standard engine.

The above figures thus indicate that the system according to the invention makes possible a substantial increase in engine performance and fuel economy. However, the system described above is only an example and can be developed to take into account additional parameters, such as for example gear position, temperature of the engine and transmission, airpressure etc., so that various control methods for charge pressure control can be used for varying driving conditions. The invention is of course not limited to turbocharged engines with charge pressure regulators on the exhaust side, but can also be used in other turbocharged engines, for example those with variable turbine geometry, variable choke etc., and those which have a regulator on the compressor side. Nor is the invention limited to control of the charge pressure with the aid of a microprocessor. Rather, analog control devices can be used even though microprocessor control is preferable, since charge pressure control can be included at low cost in an integrated system which also controls ignition and fuel supply.

The invention has been described in the preceding with reference to an embodiment in a turbocharged engine. Even though the principle of the invention has its primary application in such engines, the principle of precise control of the inlet pressure as a function of engine speed is also applicable to aspirated engines, e.g. aspirated engines which are boosted by high compression ratios, with control being effected directly at the engine throttle. Instead of direct measurement of the inlet pressure as described above, the pressure can be measured indirectly by measuring the airflow and computing the pressure with the help of the engine speed.

What we claim is:

1. In a system for controlling the charge pressure in a turbocharged combustion engine, comprising means for sensing the actual charge pressure, means to change the charge pressure, means for sensing engine speed and signal processing means disposed to receive from the sensing means signals representing pressure and engine speed and to send control signals dependent thereon to said means to change the charge pressure, said signal processing means comprising means with a memory function in which a command value for the charge pressure as a function of engine speed is stored for a predetermined engine speed range, the upper limit of which is the maximum rotational speed of the engine, the command value lying below the limit for knocking combustion for a given fuel quality and a given ignition timing at steady state operation; the improvement comprising a throttle position sensor coupled to the signal processing means and emitting a signal representing the degree of opening of the throttle, said signal processing means correcting the stored command value with a correction factor dependent on the degree of opening of the throttle.

2. System according to claim 1, characterized in that an air temperature sensor of the system is coupled to the signal processing means and that the latter are disposed to correct the stored command value by a correction factor dependent on the charge air temperature.

3. System according to claim 1, characterized in that the signal processing means are disposed to compute the rate of opening or closing the throttle, and when the rate of opening exceeds a predetermined value in combination with predetermined minimum throttle movement, to correct the stored command value by a correction factor greater than one, and then to effect timed reduction of said correction factor to one.

4. System according to claim 1, characterized in that a knock sensor is coupled to the signal processing means, and in that said means are disposed, upon detecting knocking of a certain intensity, to send a signal to the means controlling the inlet pressure to lower the actual pressure to a certain level below the command pressure.

* * * * *